United States Patent [19]
Kole et al.

[11] 3,986,899
[45] Oct. 19, 1976

[54] ATOMIZED COPPER BRAZING PASTE

[75] Inventors: Glen D. Kole, East Chicago; Paul D. Johnson, Merrillville, both of Ind.

[73] Assignee: SCM Corporation, New York, N.Y.

[22] Filed: June 7, 1974

[21] Appl. No.: 477,302

[52] U.S. Cl. .................................. 148/24; 148/23
[51] Int. Cl.² ........................................ B23K 35/34
[58] Field of Search ............ 148/24; 75/.5 C; 264/5

[56] References Cited
UNITED STATES PATENTS

| | | | |
|---|---|---|---|
| 2,566,339 | 9/1951 | Klinker | 148/24 |
| 2,606,132 | 8/1952 | Klinker | 148/24 |
| 3,073,270 | 1/1963 | Johnson | 148/24 |
| 3,623,921 | 11/1971 | Behringer | 148/24 |

*Primary Examiner*—Peter D. Rosenberg
*Attorney, Agent, or Firm*—Thomas M. Schmitz

[57] ABSTRACT

A residue-free brazing composition for brazing together metal parts is based on atomized copper particles dispersed in a fugitive binder to produce brazing paste.

9 Claims, No Drawings

3,986,899

ATOMIZED COPPER BRAZING PASTE

BACKGROUND OF THE INVENTION

Furnace brazing generally refers to processes for brazing together metal parts which have a melting point appreciably above copper. The metal parts are prepositioned into an assembly which is passed through the brazing furnace wherein a preformed copper brazing part is melted and drawn into a close fitting joint by capillary action to make a strong brazed joint. More recently, brazing pastes have been developed for brazing metal parts together. Brazing pastes are copper powders dispersed in a vehicle to provide a paste consistency which can be easily applied to any shaped metallic joint which eliminates the need for a variety of preformed brazing parts. Examples of typical brazing pastes may be found in a series of Klinker patents such as, for example, U.S. Pat. No. 2,566,339; U.S. Pat. No. 2,594,313; and U.S. Pat. No. 2,606,132; and the disclosures of said patents are incorporated herein by reference.

Prior to this invention, conventional copper brazing pastes were often based on copper oxide powders which reduce to copper metal during the brazing process. U.S. Pat. No. 2,606,132, for example, recommends copper oxide in combination with minor amounts of finely divided iron. Copper oxides have been preferred in the past since the same usually contain less impurities and can be ground to a fine powder, that is, less than four microns if so desired. Copper oxides, however, contain about 11% oxygen which is a limiting factor in most furnace brazing processes due to conventional use of a poor reducing exothermic gas. Although copper powders made by electrolysis from solutions or gaseous reduction of copper oxide have been suggested for copper brazing pastes, such copper powders were less desirable than copper oxide primarily since such copper powders generally have more non-reducible oxidic impurities than copper oxide. The impurities in electrolytic copper like copper oxide do not completely reduce to metallic state in the exothermic reducing gas used in furnace brazing. Non-reducible oxidic impurities include, for example, $SiO_2$, $CaO$, $MgO$, $ZnO$, $Al_2O_3$, and the like which tend to become complexed with copper oxide during gaseous reduction and detrimentally inhibits copper coalescence. Impure copper powders and copper oxide powders leave undesirable amounts of black residue which must be removed from the brazed part, especially when the part is subsequently plated. Fluxes such as $H_3BO_3$, $KNO_3$, $NaF$, and $KbF_4$ have been suggested to overcome the undesirable adverse effects of oxide impurities. However, the use of fluxes is not preferred since fluxes tend to damage furnace lining, conveyors, trays, and silicon carbide heating elements.

It now has been found that atomized copper powders are extraordinarily pure copper powders substantially free from oxide impurities and are particularly suitable for use in copper brazing pastes.

Accordingly, a primary object of this invention is to provide copper brazing paste based on atomized copper powder that is exceptionally pure and containing not substantially more than about 0.1% non-reducible impurities.

A further object is to provide a copper brazing paste based on atomized copper combined with minor amounts of very finely divided metal powders and/or reducible metal oxides and dispersed in a suitable fugitive vehicle.

A further object of this invention is to provide a brazing paste containing a controlled size distribution of atomized metallic copper being substantially spherical and particularly suitable to provide a residue-free brazing paste adapted to achieve clean brazed areas on assembled parts.

A further object of this invention is to provide brazing paste wherein impurities, if any, are situated substantially on the surface of the atomized copper particles rather than distributed uniformly through the copper particle.

These and other advantages of this invention will become more apparent by referring to the Detailed Description of the Invention.

SUMMARY OF THE INVENTION

Briefly, this invention provides a residue-free brazing paste based on atomized copper particles dispersed in a fugitive binder. The atomized copper or copper alloys contain less than about 0.1% (wt.) non-reducible impurities.

DETAILED DESCRIPTION OF THE INVENTION

This invention pertains to brazing pastes based on atomized copper powder containing non-reducible impurities not more than about 0.1% by weight and having an average particle size of between about 5 to 177 microns. Preferably, the copper particles are substantially spherical and within a micron range of about 10 microns to 105 microns. The copper particles are substantially free of impurities and contain less than about 0.1% by weight of oxidic impurities not reducible to the copper metallic state by conventional exothermic furnace brazing gas. Most preferably, the copper contains less than 0.05% by weight oxidic impurities. Non-reducible oxide impurities are metal oxide impurities which will not reduce to the metallic state during furnace brazing. Although reducing gas and brazing conditions vary somewhat, non-reducible oxide impurities can be determined by well-known methods such as disclosed in American Welding Society Brazing Manual, 2nd Ed., (1963), p. 61, and incorporated herein by reference. Non-reducible oxide impurities include, for example, $CaO$, $BeO$, $MgO$, $Al_2O_3$, $TiO_2$, $WO_2$, $MoO_2$, $SiO_2$, $MnO$, $Cr_2O_3$, and $ZnO$ as well as rare earth oxides. In contrast, reducible oxides at copper brazing temperature of about 2000° to 2100° F ordinarily include, for example, $Cu_2O$, $PbO$, $CoO$, $NiO$, $FeO$, $Fe_2O_3$, $SnO_2$, $BiO$ and like reducible oxides. Non-reducible oxides have been found to inhibit copper coalescence and produce considerable residue on the brazed part. Non-reducible impurities, if any, are essentially confined to the surface or surface portions of atomized copper rather than distributed through the copper particles as is found in electrolytic copper particles. Atomized copper particles containing non-reducible oxides, if any, on the surface of the copper particles exert essentially no effect on the coalescence of the particles during the brazing process. Non-reducible oxide impurities tend to become complexed with copper oxide during the conversion of copper oxide to copper powder in the gaseous reduction process. Further, these copper complexed impurities are generally distributed internally throughout the copper particles and fail to reduce thus yielding a black residue. Accordingly, atomized copper has been found to be much superior for brazing paste when compared to conventional copper particles produced by electrolysis and/or gaseous reduction processes wherein the copper produced is complexed with impurities distributed internally throughout the copper particle. The atomized copper has oxide impurities, if any, on the surface of the particles whereby such impurities exert minimal effect on copper coalescence during the melting thereof occurring in the brazing process.

Atomized copper can be produced by known methods such as described in U.S. Pat. No. 2,956,304 wherein a plurality of liquid streams are directed from points preferential about the middle stream of molten metal to disintegrate the molten metal stream. A plurality of nozzles of the type shown in FIGS. 10 and 11 in U.S. Pat. No. 2,956,304 can be adjusted to produce a diverging flat liquid stream so that the flat liquid streams intersect the liquid metal streams at an angle of about 50° to 60°, as more particularly set forth in said patent and incorporated herein by reference. The liquid atomized metal particles have a desirable size distribution and tend to assume a preferential spherical shape. Spherical atomized copper particles have higher apparent densities up to about 4.8 to 5.3 gms./cc. which can yield brazing paste densities up to about 40 to 46 pounds/gallon. Atomized copper produces substantially pure copper particles having impurities, if any, disposed on the surface of the copper particles. The preferred method of atomization is via water atomization.

Exceptionally pure copper powder can be produced by use of selective raw materials and by careful slagging. The preferred copper for atomization is Fire-Refined or pure copper complying with the requirements of A.S.T.M. Test Designation: B216-72 entitled "Fire-Refined Copper For Wrought Products and Alloys" wherein such copper is carefully slagged by skimming slag from the top of the melt prior to water atomization of the copper melt. Slagging is preferably done by allowing the copper melt to cool about 100° F which facilitates removal. Gathering of the slag is achieved by skimming and removing the slag from the surface of the melt. Thereafter, the copper melt can be reheated to at least about 100° F above the melt temperature and thereafter atomized.

The atomized copper can be in the form of atomized copper alloys containing major amounts of copper alloyed with lesser amounts of phosphorous, arsenic, gallium, germanium, silicon, manganese, nickel, or aluminum, as well as gold, silver, indium, boron, beryllium, bismuth, cobalt, antimony, chromium, iron, magnesium, titanium, palladium, tin, and lead wherein the alloy contains up to about 45% alloying metals. The desirable brazing compositions are those employing a copper base for brazing at temperatures between about 1300° F and 2100° F. For reasons of efficiency and economy, atomized brass and bronze powders are the preferred atomized copper alloy powders used in accordance with brazing compositions of this invention. The atomized copper alloy powders are finer than 80 mesh and preferably about 50% minus 325 mesh. Such particulate alloy powders for brazing pastes provide quicker melting, better flow into the joint, and compounds better into a paste that can be easily dispensed from a variety of suitable apparatus.

A preferred aspect of this invention provides that atomized copper or copper alloys can be combined in a physical mixture with vry finely divided metal powders selected from iron, copper-tin alloy, nickel, and fine or reducible oxides of iron or nickel. Generally when iron is included, no more than 6% (wt.) of iron is added although up to about 16% iron by weight can be used. Preferably, when iron only is added, the metal brazing component contains 1% to 14% iron mixed with atomized copper to form the brazing paste of this invention. The preferred iron particles are carbonyl iron having an average particle size less than about 5 microns. The fine particles of iron, nickel, or copper-tin alloy are physically admixed with the copper powder and then dispersed in a fugitive vehicle. The finely divided iron, nickel, or copper-tin alloy, or reducible oxides thereof, preferably are smaller in diameter than the atomized copper particles and usually less than about 5 microns in diameter. When reducible oxidized metals are added, such oxides preferably are copper alloy and have a particle size distribution comparable to the atomized copper. Reducible oxides capable of liberating the metallic component thereof during brazing can be added in minor amounts and generally comprise $Cu_2O$, PbO, CoO, NiO, FeO, and $Fe_2O_3$. Such oxides should be finely divided powders having a preferred fineness of less than about 5 microns in diameter.

The atomized copper powder, or copper alloy, and/or admixture thereof with minor amounts of iron, copper-tin alloy, nickel or zinc can be dispersed in fugitive binders or vehicles for binding the powder metal mixture. The fugitive binders generally comprise resinous compositions for the purpose of facilitating adhesion of the metal powder to the metal substrate to be brazed, soldered, or filled. Binders provide cohesion of metal powders prior to brazing, impart lubricity to the brazing composition, and hold the brazing composition onto the part to be brazed. Suitable fugitive binders maintain adhesion of the metal components of the brazing paste prior to brazing, but the fugitive binder burns off during furnace brazing and leaves little or no residue on the brazed assembly. Fugitive binders generally have a low Conradson value (A.S.T.M. Standards D-189-46) below about 1% so that little, if any, carbonaceous material remains as a residue after the brazing process. Carbonaceous residue is a deposit that appears after brazing wherein the residue ordinarily comprises ultra-fine copper spheres that failed to coalesce due to the presence of submicron decompositional carbon and oxide impurities such as CaO, BeO, MgO, $Al_2O_3$, $TiO_2$, $WO_2$, $MoO_2$, $SiO_2$, MnO, $Cr_2O_3$, and ZnO.

Fugitive binders decompose at working or brazing temperatures and preferably decompose at a temperature much lower than the brazing temperature. Decomposition temperatures of 400° to 550° F are desirable whereby such binders sufficiently decompose and form volatile compounds as well as being substantially smokeless and odorless at such working temperatures. The resinous fugitive binder forms a film prior to working due to partial volatilization of the solvent system resulting in increased cohesion of the brazing metal particles and adhesion to the workpiece to which the brazing paste is applied. Examples of fugitive binders having the foregoing properties include homopolymers and copolymers of lower alkyl esters of acrylic acids and methacrylic acids having 1-8 carbon atoms such as, for example, methylmethacrylate, ethylacrylate, mmethylacrylate, 2-ethyl hexyl acrylate, or mixtures thereof; polystyrene, polyvinyl chloride, polyvinyl acetate, butadienestyrene latices, and polytetrafluoroethylene; cellulosic polymers such as water-soluble cellulosic materials like sodium carboxymethylcellulose, cellulose acetate, cellulose nitrate, and cellulose acetate butyrate; polyolefins such as polypropylene and polyethylene; epoxy resins and polyesters; and rosins such as tall oil rosin and gum rosin. For efficiency and economy, the lower alkyl esters having 1-6 carbon atoms of acrylic and methacrylic acids are preferred. The preferred binder systems are gelled glycol and/or glycerine-water, and kerosene-polyisobutylene (or diethylene glycol diethyl ether) thixcin emulsion, glycerine and xanthone gum, and celluloses such as hydroxyethylcellulose, and sodium carboxymethylcellulose, and methocellulose and/or mixtures of the foregoing.

Sufficient fugitive binder is used in conjunction with the metal powders to bind sufficiently the metal powder together and provide adhesion of the brazing paste to the metal substrate workpiece prior to brazing. Brazing compositions can contain about 15% to 50% by weight of fugitive binder, but in water base vehicle systems less than about 2% binder is normally used.

The fugitive binder can further include minor amounts of chelating agents up to about 10% of the fugitive binder wherein the chelating agent is a hydroxy or a carboxy derivative of a diamine or hydroxy carboxylic acid such as disclosed in commonly assigned co-pending application U.S. Ser. No. 281,543. Organic chelating agents are particularly adapted for use in brazing and soldering compositions and leave little, if any, residue which burns away completely during the brazing or soldering operation.

Solvents can be used in the fugitive binder system for desirably rendering the fugitive binder composition in a form suitable for application. Suitable solvents are relatively non-volatile at about 70° F so that the vehicle system will not have a tendency to dry out prior to use and thus cause difficulties in dispensing in a pressure pot apparatus such as disclosed and described in commonly assigned and co-pending U.S. application Ser. No. 281,543. Solvents should volatilize readily at temperatures of about 300° F and decompose without producing more than a minor amount of carbonaceous residue, smoke, or odor during the brazing operation. Suitable solvents include hydrocarbons such as hexane, heptane, kerosene, pentane, and aromatic solvents such as benzene, naphthas toluene having a boiling point of up to 450° F and ketones such as acetone, methylisobutyl ketone, methyl ethyl ketone and isobutyl ketone; and glycerine, glycols such as ethylene, propylene and diethylene glycol; esters such as methyl acetate, ethyl acetate, butyl acetate, and monoethyl ether acetate; glycol ethers such as diethylene glycol diethyl ether; alcohols such as ethanol, propanol, methanol, ether alcohols such as 2-ethoxy ethanol, 2-ethoxy butanol and ether ketones, Water can be used as a solvent (usually in combination with organic solvents that suppress the freezing point, e.g. monoethylene glycol), but is sometimes objectionable due to the deleterious effects water may have on the furnace brazing of easily oxidized metals such as stainless steel in dry atmosphere (−40° F or lower dew point).

The fugitive binder is proportioned with solvent and other binder constituents and are formulated to achieve desired brazing paste viscosities which, for example, can range from 3,000 centipoises to 150,000 centipoises at 78° F (using an RVT Brookfield Viscometer, No. 7 spindle, 20 rpm). Brazing compositions having lower viscosities can be used by spray application or brush application, whereas brazing compositions having higher viscosities are normally applied with air pressurized systems that deliver paste to the work via a flow gun or less sophisticated equipment like oilers and plastic bottles. Desirably, the fugitive binder system contains from about 50% to 90% solvent by weight and preferably about 80% solvent to give a 20% binder solid.

Although the use of a flux can be effectively eliminated by the brazing composition of this invention, such fluxes can be added to the brazing compositions if desired. Conventional fluxes can be used and include alkali metal fluoroborates, alkali metal carbonates, alkali metal meta-, penta-, and tetraborates, boric acid, alkali metal nitrates, alkali metal chlorides, and hydrohalide salts of hydroxyamines. Preferably no fluxes are included in the brazing composition although flux can be added up to about 30% in the brazing composition.

The brazing pastes can be produced by simply adding all of the materials to a mixer and subjecting the ingredients to agitation at room temperature or moderate heat to effect dispersion of the powder metal mixture within the fugitive binder. When a uniform brazing paste composition is achieved, the paste can be removed from the mixer and thereafter screened through a 40 mesh screen or preferably an 80 mesh screen prior to use. The resulting brazing paste is usually kept in a closed container so as to avoid loss of volatile solvents prior to use.

In preparing an assembly for brazing, the brazing composition can be applied to an assembled metal part and brazed at once or allowd to set prior to brazing. The workpiece coated with brazing paste is then introduced into a brazing furnace wherein the copper or copper alloy metal mixture fuses to become molten metal which flows into the joint. The fugitive binder volatilizes leaving essentially a brazed metal with very little, if any, residue. The heating of the metal workpiece can be effected by a furnace such as a brazing furnace, acetylene-oxygen torch, hot salt bath, electrical means, or other conventional heating techniques useful in brazing.

The metal workpieces adapted for brazing with the brazing paste composition in accordance with this invention are primarily ferrous-containing materials such as, for example, iron, cast iron, steel, stainless steel, mild steel, low and high carbon steel, and also select non-ferrous materials such as nickel and certain nickel base alloys like cupro-nickel.

The following examples are provided to illustrate preferred embodiments of this invention but are not intended to limit the scope thereof.

EXAMPLE 1

Copper brazing pastes were made from the following ingredients wherein each formulation provided 100 gallons of paste and was based on different copper powder.

| Ingredients | A | B | C |
| --- | --- | --- | --- |
| Water | 379 lbs. | 329 lbs. | 231 lbs. |
| Glycerine | 252 lbs. | 220 lbs. | 154 lbs. |

-continued

| Ingredients | A | B | C |
|---|---|---|---|
| Xanthane Gum | 21 lbs. | 18 lbs. | 13 lbs. |
| −200 mesh reduced copper powder (2.6 g/cc, analyzing 99.30% copper, 0.05% iron, and 0.03% lead by weight and 0.08% non-reducible oxide impurities) | 1738 lbs. | | |
| −80 mesh water atomized copper powder Fisher No.= 17.4 ($\mu$). (3.3 g/cc, at 99.61% copper, 0.05% iron, and 0.01% lead by weight and 0.04% non-reducible oxide impurities) | | 2553 lbs. | |
| −60 mesh atomized copper powder (5.0 g/cc, at 99.61 % copper, 0.04% iron, and 0.01% lead and 0.04% non-reducible oxide impurities) | | | 2832 lbs. |

Each brazing paste A, B, and C were processed by first charging the glycerine component into a conical hopper and while mixing at high speed with a Lightening Mixer the Xanthane Gum ingredient was slowly added to the glycerine. The glycerine and Xanthane Gum was thoroughly mixed until the latter became thoroughly dispersed. The mixture was then added to a double planetary mixer whereupon the water was added and mixed therein for about one hour to dissolve the Xanthane Gum and until a gel consistency was fully developed. The atomized copper powder ws added to the gel and thereafter mixed for about one hour until a uniform paste consistency developed which ws measured by taking small test samples from both top and bottom. Uniformity was achieved when both top and bottom samples had the same weight per gallon and viscosity. The uniform paste was passed through a vibratory 40 mesh screen and then packaged for use. Each paste A, B, and C was tested with the following results.

TABLE 1

| Test | A | B | C |
|---|---|---|---|
| Density (pounds/gallon) | 23.9 | 31.2 | 42.3 |
| Heat test (1) | Pass | Pass | Pass |
| Melt test (2) | Good | Better | Best |
| Slump test (3) | < ¼ | < ¼ | ¾ |
| Viscosity, cps. (4) | 41,000 | 50,000 | 56,000 |

Sample A left a carbonaceous residue. The inclusion of about 0.30% flux was necessary to obtain a reasonably clean braze.

Samples B and C gave excellent brazing paste compositions having desirable slow air drying characteristics and excellent resistance to slump or running on a vertical surface. Excellent brazed joints resulted by brazing at 2050° F with negligible smoke and no carbonaceous residue.

1. Heat test indicates paste will not spatter as vehicle dissipates in early stages of furnace heatup and was tested by placing a ribbon (⅛ inch wide × ⅛ inch thick × 3 inches long) of each paste A, B, and C on a 4 inch × 5 inch stainless steel test panel having a ½ inch upper portion bent 90°. The ½ inch lip was placed on a preheated hotplate surface and preheated 15 minutes to 2050° F in such a manner that the length of the test ribbon was disposed vertically.

2. Melt test indicates type and amount of residue in the area of brazing. The test was run by placing a 10.0 ± 0.1 gram of each test paste A, B, and C in detinned penetration test box lids (or clean steel lids) and processed in accordance with intended brazing temperatures (2050° F) within a tube furnace equipped with the exothermic reducing atmosphere (alternatively, endothermic, hydrogen, or dissociated ammonia) for a time sufficient to cause vehicle dissipation and subsequent melting of filler metal. The test lids and metal were cooled in the furnace atmosphere to room temperature. Visual inspection of the surface appearance indicates relative residue, if any, and overall appearance of test melt.

3. Slump test indicates the brazinng paste resistance to slump or running when placed on angular and vertical surfaces. The slump test consists of adjusting the test pastes A, B, and C to 78° F and thereafter filling a slump test apparatus having a volume of 0.30 cubic inches. A slump reading to the nearest ⅛ inch is taken after 30 seconds and again after 5 minutes.

4. Viscosity indicates consistency and the effort required to extrude the brazing paste or required air pressure needed to dispense the paste. Viscosity was run on paste samples A, B, and C at 78° F using a Brookfield Moder RTV viscosimeter and a No. 7 spindle at 20 rpm. The viscosimeter reading is taken 30 seconds after starting the viscosimeter motor running the spindle.

EXAMPLE 2

A 100 gallon sample of copper brazing paste was made from the following ingredients in the manner of Example 1.

| Ingredients | |
|---|---|
| Water | 378 lbs. |
| Glycerine | 210 lbs. |
| Xanthan Gum | 5 lbs. |
| Modified Galoctomanan Gum | 9 lbs. |
| Methocel 65HG (4000 cps) | 3 lbs. |
| −80 Mesh Atomized Copper | 2245 lbs. |

The paste was tested in the manner indicated in Example 1 with the following results:

| | |
|---|---|
| Density, lbs/gal | 28.5 |
| Heat Test | Pass |
| Melt Test (Exothermic Atmosphere) | Clean |
| Slump Test (5 minutes), " | ¾ |
| Viscosity, cps | 60,000 |

The paste was suitable for the furnace brazing of steel parts at 2000° to 2100° F in a reducing type atmosphere and provided excellent brazed joints. The atomized copper combined with minor amounts of alloy (copper-tin) avoided vehicle breakdown.

EXAMPLE 3

A brazing paste (100 gallons) was produced in the manner of Example 1 from the following ingredients:

| Ingredients | | |
|---|---|---|
| Water | 475 | lbs. |
| Ethylene Glycol | 89 | lbs. |
| Glycerine | 30 | lbs. |
| High Molecular Weight Hydroxyethylcellulose (Cellosize QP-100M, Union Carbide) | 4 | lbs. |
| Xanthan Gum (Keltrol F, Kelco Co.) | 18 | lbs. |
| −80 Mesh Atomized Copper | 1584 | lbs. |

Test results:

| Density, lbs/gal | 22.0 |
|---|---|
| Heat Test | Pass |
| Melt Test (Exothermic Atmosphere) | Clean |
| Slump Test (5 minutes), " | 1 |
| Viscosity, cps | 50,000 |

The paste was suitable for the furnace brazing of steel parts in a reducing type atmosphere at 2000° to 2100° F and provided excellent brazed joints.

EXAMPLE 4

A brazing paste (100 gallons) was produced in the manner of Example 1 from the following ingredients:

| Ingredients | | |
|---|---|---|
| Water | 337 | lbs. |
| Kerosine | 32 | lbs. |
| Xanthan Gum | 13 | lbs. |
| Hydroxyethylcellulose | 1 | lbs. |
| Ethylene Glycol | 181 | lbs. |
| Igepal Surfactant - GAF CO-210 | 1 | lbs. |
| Igepal Surfactant - GAF CO-850 | 1 | lbs. |
| −80 Mesh Atomized Copper Powder | 1210 | lbs. |
| −60 Mesh Atomized 50CU-50Sn alloy (U.S. Bronze 4.7 g/cc A.D.) | 381 | lbs. |
| Synthetic Wax Powder | 43 | lbs. |

The test results are as follows:

| Density, lbs/gal | 22.0 |
|---|---|
| Heat Test | Pass |
| Melt Test (Exothermic Atmosphere, 1825–1900°F) | Clean |
| Slump Test (5 minutes), (Exothermic Atmosphere, 1825–1900° F) | ½ |
| Viscosity, cps | 60,000 |

Paste was particularly suitable for producing residue-free joints on parts containing copper-coated steel tubing. Excellent brazed joints resulted.

EXAMPLE 5

A copper brazing paste (100 gallons) was made from the following ingredients in a manner of Example 1:

| Ingredients | | |
|---|---|---|
| Water | 434 | lbs. |
| Ethylene Glycol | 193 | lbs. |
| Xanthan Gum | 5 | lbs. |
| Sodium Carboxymethylcellulose | 5 | lbs. |
| −80 Mesh Atomized Copper Powder | 1960 | lbs. |
| Iron Powder (Carbonyl E - GAF) | 293 | lbs. |

Test results:

| Density, lbs/gal | 28.9 |
|---|---|
| Heat Test | Pass |
| Melt Test, (Exothermic Atmosphere) | Clean |
| Slump Test (5 minutes), " | 1½ |
| Viscosity, cps | 58,000 |

Paste was particularly suitable for the furnace brazing of steel parts with joint clearances exceeding 0.003", which is the normal maximum for copper brazing. Excellent brazed joints resulted. The atomized coper mixed with minor amounts of carbonyl iron had substantially improved bridging qualities and effectively avoided vehicle degradation. In comparison, similar brazing pastes based on electrolytic of reduction process copper mixed with electrolytic iron produced inferior and undesirable brazing compositions having poor bridging qualities and vehicle breakdown.

EXAMPLE 6

A copper-nickel alloy brazing paste (100 gallons) was made from the following ingredients in a manner of Example 1:

| Ingredients | | |
|---|---|---|
| Water | 351 | lbs. |
| Ethylene Glycol | 120 | lbs. |
| Hydroxyethylcellulose | 2 | lbs. |
| Xanthan Gum | 2 | lbs. |
| Sodium Carboxymethylcellulose | 6 | lbs. |
| −80 Mesh Water Atomized Copper-Nickel (4.6 g/cc A.D., analyzing 2.75 % Nickel, 0.04 % Boron, 0.003 % Phosphorus, balance Copper.) | 3029 | lbs. |

Test Results:

| Density, lbs/gal | 35.1 |
|---|---|
| Heat Test | Pass |
| Melt test (Dissociated Ammonia Atmosphere) | Clean |
| Slump Test (5 minutes), " | 2 |
| Viscosity, cps | 46,000 |

Paste is particularly suitable for the furnace brazing of steel parts with joint clearances exceeding 0.003" and excellent brazed joints resulted.

EXAMPLE 7

Copper brazing pastes containing three different copper powders were made from the following ingredients in a manner of Example 1 to produce 100 gallon samples of D, E, and F.

| Ingredients | Batch D | Batch E | Batch F |
|---|---|---|---|
| Kerosine-Vistanex (10 solution of polyisobutylene in water-white kerosine | 347 lbs. | 317 lbs. | 222 lbs. |
| Diethylene Glycol Diethyl Ether | 105 lbs. | 96 lbs. | 67 lbs. |
| Thixcin (Thixotrope made from Castor Oil 25% dispersion in mineral spirits | 33 lbs. | 30 lbs. | 21 lbs. |
| —200 mesh reduced copper powder | 1935 lbs. | | |
| —80 mesh atomized copper | | 2487 lbs. | |
| —60 mesh atomized copper | | | 3880 lbs. |

Test results:

| | Batch D | Batch E | Batch F |
|---|---|---|---|
| Density, lbs/gal | 24.2 | 29.3 | 41.9 |
| Heat Test | Pass | Pass | Pass |
| Melt Test (Dissociated Ammonia) | Good | Better | Best |
| Slump Test | ¾ | 1¼ | 2 |
| Viscosity, cps | 126,000 | 116,000 | 94,000 |

The foregoing examples are illustrative of this invention but are not intended to be limiting except as defined in the appended claims.

What is claimed is:

1. A residue-free copper brazing paste comprising copper particles dispersed in a fugitive binder, the improvement comprising:
said copper particles being atomized elemental copper having a particle size between about 5 to 177 microns and being substantially free of non-reducible oxide particles, said particles containing less than 0.1% by weight of non-reducible oxide wherein said impurities are confined to the surface of said copper particles.

2. The copper brazing paste in claim 1 wherein the non-reducible oxide impurities are less than about 0.05% by weight.

3. The copper brazing paste set forth in claim 1 wherein the copper particles are substantially spherical and are water-atomized copper particles.

4. The copper brazing paste in claim 1 wherein the copper particles are copper alloy.

5. The copper brazing paste in claim 1 wherein the copper particles are combined with at least about 0.5% by weight iron particles having a particle size less than the particle size of the copper.

6. The copper brazing paste in claim 5 wherein the iron particle size is less than about 10 microns.

7. the copper brazing paste in claim 5 wherein the iron powder is carbonyl iron.

8. The copper brazing paste in claim 5 wherein the metal mixture comprises between about 1% to 14% by weight of said iron.

9. The copper brazing paste in claim 1 containing at least about 0.5% by weight metal powder selected from iron, copper-tin alloy, and nickel, and said metal powder has a particle size less than the particle size of said copper.

* * * * *